United States Patent [19]

Pryor

[11] 3,767,906

[45] Oct. 23, 1973

[54] MULTIFUNCTION FULL ADDER

[75] Inventor: Richard Lee Pryor, Cherry Hill, N.J.

[73] Assignee: RCA Corporation, New York, N.Y.

[22] Filed: Jan. 21, 1972

[21] Appl. No.: 219,747

[52] U.S. Cl. .................. 235/175, 235/152, 307/207

[51] Int. Cl. .......................... G06f 1/02, G06f 7/385

[58] Field of Search .................... 235/152, 156, 164, 235/168, 175, 176; 307/207

[56] References Cited

UNITED STATES PATENTS

| | | | |
|---|---|---|---|
| 3,612,847 | 10/1971 | Jorgensen | 235/175 X |
| 3,348,199 | 10/1967 | Jorgensen | 340/146.2 |
| 3,576,984 | 5/1971 | Gregg | 235/176 |
| 3,604,909 | 9/1971 | Vogel et al. | 235/175 |
| 3,317,721 | 5/1967 | Berlind | 235/176 |
| 3,388,239 | 6/1968 | Duncan et al. | 235/175 |

*Primary Examiner*—Malcolm A. Morrison
*Assistant Examiner*—James F. Gottman
*Attorney*—H. Christoffersen et al.

[57] ABSTRACT

An arithmetic unit which may be utilized in any binary computational circuit. The arithmetic unit utilizes a pair of exclusive OR gates connected in series. One of the exclusive OR gates operates upon input signals (e.g. addend and augend) to produce an output signal. The other exclusive OR gate operates upon input signals (e.g. carry and output from the first OR gate) to produce the sum output signal. A two-way transmission gate switch operates upon certain input signals (e.g. carry, addend or augend, and output signal produced by the first exclusive OR gate) to produce the carry output signal.

4 Claims, 2 Drawing Figures

MULTIFUNCTION FULL ADDER

STATEMENT

The invention described herein was made in the performance of work under a NASA contract and is subject to provisions of Section 305 of the National Aeronautics and Space Act of 1958, Public Law 85–568 (72 Stat. 435; 42 U.S.C. 2457).

BACKGROUND

When two binary numbers are to be added together, a carry signal must be generated for each bit addition. This carry signal must pass serially through the adder circuit from bit to bit from the least to the most significant bit. There are known a number of carry prediction schemes or circuits which are utilized to improve the speed of computation of the carry. In general, however, the carry computation remains the limiting factor in determining the speed with which binary addition can be performed.

For the simplest adder circuit, each adder segment receives its "carry-in" value or signal from its less significant neighboring adder circuit, operates upon the augend and addend bits which correspond to the specific adder segment and computes the sum bit and "carry-out" bit for that segment. The carry-out bit is passed along to the more significant neighboring adder segment for further operation. Thus, the carry value signal is passed serially from segment to segment of the adder circuit except that each segment (i.e. bit segment of the adder circuit) has an option conditional upon the input bits (i.e. augend and addend) as to whether or not the carry bit should be altered or passed along unchanged.

In producing this function, most of the known logic implementations of adder circuits necessitate an inversion of the carry-out signal which, therefore, requires that this signal must then be inverted again before using. Alternatively, the succeeding stage must be implemented differently (for example, inverted logic) to accept the inverted signal at the carry-in terminal. Each of these approaches has disadvantages and limitations. For example, the additional inversion operation inserts a further delay in the overall addition process. Similarly, omitting the inversion stage and using different alternating stages in the adder circuit is cumbersome and undesirable in circuit fabrication.

SUMMARY OF THE INVENTION

A pair of exclusive OR gates are connected to receive the addend, augend and carry-in signals. The addend and augend signals are supplied to one of the exclusive OR gates while the carry-in signal and the output signal of the first exclusive OR gate are supplied to the second exclusive OR gate which then produces a sum output signal. A two-way transmission gate switch receives as input signals one of the addend or augend signals and the carry-in signal. A control signal from the output of the first exclusive OR gate controls which of the input signals to the transmission gate switch will be supplied to the carry-out terminal.

By utilizing additional two-way transmission gate switches and a three-way transmission gate switch, an arithmetic unit capable of multi-function operation, as determined by specific control input signals, is provided.

DESCRIPTION OF THE PREFERRED EMBODIMENTS

Figure 1:
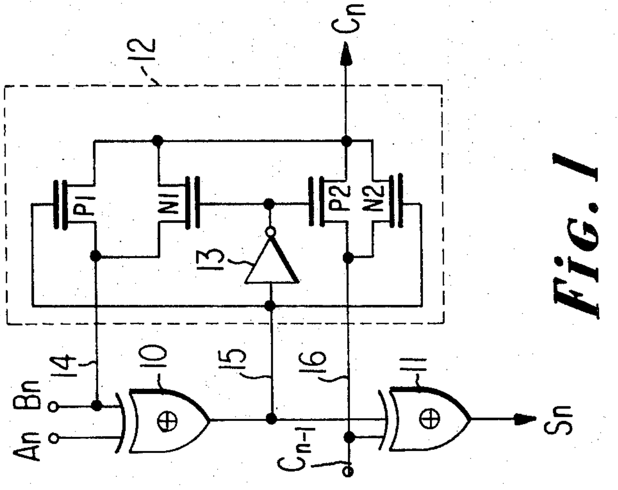
FIG. 1 is a schematic diagram of one embodiment of the instant invention.

Referring now to FIG. 1, there is shown a schematic diagram of one embodiment of the instant invention. Logic circuits 10 and 11 are defined as exclusive OR gates. Exclusive OR gates are known in the art and are defined as gate circuits which produce an output signal if, and only if, one specified input signal is supplied to the input terminals thereof. For example, a binary 1 output signal is supplied at the output terminal of gate 10 if, and only if, a binary 1 input signal is applied at either the $A_n$ or the $B_n$ input terminal. In the event that a binary 1 (or a binary 0) is supplied to both the $A_n$ and the $B_n$ input terminals, the output signal supplied by gate 10 will be a binary 0. This operation, as depicted in Table I below, is equally applicable to exclusive OR logic gate 11.

TABLE I

| $A_n$ | $B_n$ | Output |
|---|---|---|
| 0 | 0 | 0 |
| 1 | 0 | 1 |
| 0 | 1 | 1 |
| 1 | 1 | 0 |

As suggested, the input terminals $A_n$ and $B_n$ (which represent the addend and augend input signals) are connected to input terminals of exclusive OR gate 10. The output terminal of gate 10 is connected to one input of exclusive OR gate 11 while the $C_{n-1}$ (the carry-in signal) is connected to another input terminal of gate 11. The output of gate 11, the sum signal $S_n$, is supplied at output terminal $S_n$.

Transmission gate switch 12 includes a pair of transmission gates comprised of typical metallic oxide semiconductor field-effect transistors (MOSFET). This type of device is known in the art, but briefly, is defined as including a conduction path between two terminals normally designated the source and drain terminals. In addition, an insulated gate electrode is utilized to control the conduction through the conduction path between the source and drain electrodes. Moreover, these devices are of the P and N types. In enhancement type MOSFET devices as described herein, a P-type MOS device exhibits greater conduction through the conduction path when the gate electrode is more negative relative to the source electrode. Conversely, in an N-type device, conduction is increased as the gate electrode becomes more positive relative to the source electrode of the MOS device. The type of device is indicated by the P or N designation in the associated reference numeral.

In switch 12, the conduction paths of MOS devices P1 and N1 are connected in parallel. One end of the parallel connected conduction paths is connected via line 14 to one of the inputs of gate 10. In this case, the connection via line 14 is to the $B_n$ input terminal. It should be understood that the connection may be equally as well made to the $A_n$ input terminal.

The conduction paths of devices P2 and N2 are connected in parallel. One end of these parallel connected conduction paths is connected via line 16 to the $C_{n-1}$ input terminal (and to one input of gate 11). The opposite ends of the conduction paths of devices P1, N1; P2 and N2 are connected together and to carry output terminal $C_n$. The gate electrodes of devices N1 and P2 are connected together and to the output terminal of inverter circuit 13 which may be any typical inverter circuit known in the art. Similarly, the gate electrodes of devices P1 and N2 are connected together and to the input terminal of inverter 13. The input terminal of inverter 13 is connected via line 15 to the output terminal of gate 10.

In the description, signals are identified by the reference designation ascribed to the terminal where the signal is applied. It will be seen that, in general, this circuit operates as an adder circuit. That is, the addend and augend signals (i.e. $A_n$ and $B_n$), as well as the carry-in signal (i.e. $C_{n-1}$), are supplied to the circuit and the circuit produces the output sum signal (i.e. $S_n$) and the output carry signal (i.e. $C_n$). Moreover, it is seen that the output carry signal and the input carry signal are not inverted relative to each other. Thus, the disadvantages of many prior art circuits, as suggested supra, are avoided.

In operation, the $A_n$, $B_n$ and $C_{n-1}$ signals are supplied to the circuit. The $C_{n-1}$ signal is supplied to one input of exclusive OR gate 11 and to one input of transmission gate switch 12. More specifically, the $C_{n-1}$ signal is connected via line 16 to the conduction paths of devices P2 and N2. Similarly, the $B_n$ input signal is supplied to an input of exclusive OR gate 10 and to another input of transmission gate switch 12. Again, more specifically, the $B_n$ signal is connected via line 14 to the conduction paths of devices P1 and N1. Since the output terminal $C_n$ is connected to the other ends of the conduction paths of each of the MOS devices, the signal $C_n$ will be representative of either the $B_n$ of the $C_{n-1}$ signal which is supplied to the respective input terminals.

In general, the operation is such that if the signals supplied at terminals $A_n$ and $B_n$ are identical, the signal at terminal $B_n$ will be transmitted along line 14 through devices P1 and N1 to output terminal $C_n$. Conversely, if $A_n$ and $B_n$ are of different sign or magnitude, then the $C_{n-1}$ signal will be transmitted along line 16 through devices P2 and N2 to output terminal $C_n$.

An evaluation of the circuit operation and addition of binary signals (in accordance with standard binary addition techniques) will show that this operation produces the appropriate output signal at carry output terminal $C_n$. That is, if the addend and augend are both zeros, a binary 0 output signal will be generated at terminal $C_n$ regardless of the condition of the carry-in signal at terminal $C_{n-1}$. Likewise, if both the addend and augend at terminals $A_n$ and $B_n$ are binary 1's, a binary 1 signal will appear at the carry output terminal $C_n$ regardless of the condition or status of the carry-in signal at terminal $C_{n-1}$. Thus, this circuit recognizes this condition and, if the signals at terminals $A_n$ and $B_n$ are identical, the signal at terminal $B_n$ is immediately transmitted to output terminal $C_n$ via line 14 and devices P1 and N1. These conditions are shown in the first four lines of Table II below.

Conversely, if the signals at terminals $A_n$ and $B_n$ are different, i.e. one input signal is a binary 1 while the other input signal is a binary 0 (e.g. see lines 5 through 8 of Table II), it will be seen that the carry-in signal at input terminal $C_{n-1}$ will be transmitted along line 16 through the conduction paths of devices P2 and N2 to output terminal $C_n$. Again, evaluating standard binary addition operation, the carry output signal is directly controlled by the carry-in signal when the addend and augend are different. That is, if the addend and augend input signals are not the same, then only one of the input signals is a binary 1 (and the other is a binary 0) whereupon the carry output signal $C_n$ will be directly determined by the logic value of the carry-in signal $C_{n-1}$.

By reference to Table II below, it is clear that the value of the carry-out signal $C_n$ is determined by any two of the three signals which are similar. The third signal, in that case, controls the sum signal $S_n$ which is derived at the output of gate 11 and is only of incidental interest at this point in the description.

TABLE II

| | $A_n$ | $B_n$ | $C_{n-1}$ | $C_n$ | $S_n$ |
|---|---|---|---|---|---|
| (1) | 0 | 0 | 0 | 0 | 0 |
| (2) | 0 | 0 | 1 | 0 | 1 |
| (3) | 1 | 1 | 0 | 1 | 0 |
| (4) | 1 | 1 | 1 | 1 | 1 |
| (5) | 0 | 1 | 0 | 0 | 1 |
| (6) | 0 | 1 | 1 | 1 | 0 |
| (7) | 1 | 0 | 0 | 0 | 1 |
| (8) | 1 | 0 | 1 | 1 | 0 |

In describing the specific operation of the circuit shown in FIG. 1, initially assume that the signals supplied at terminals $A_n$ and $B_n$ are binary 0 signals which are defined to be relatively negative or low level signals. Conversely, of course, a binary 1 signal is a high level or relatively positive signal, by definition. With the application of two binary 0 signals to the inputs of gate 10, a binary 0 output signal is produced thereby (see Table I). This binary 0 signal is supplied along line 15 to the input of inverter 13 as well as to one input of exclusive OR gate 11. Moreover, the binary 0 signal at terminal $B_n$ is supplied along line 14 to the conduction paths of devices P1 and N1. The binary 0 signal at the input of inverter 13 (supplied via line 15) is further applied to the gate electrodes of devices P1 and N2. This binary 0 signal is also inverted by inverter 13 whereby a binary 1 signal is applied to the gate electrodes of the N1 and P2 devices. In accordance with the standard convention, the binary 0 signal at the gate of the P1 device causes this device to be conductive (or at least ready for conduction depending upon the signals applied at the terminals of the conduction path). Conversely, the binary 0 signal at the gate electrode of the N2 device renders this device nonconductive. Similarly, the binary 1 signal at the gate electrode of the N1 device renders this device conductive (or ready for conduction) while the binary 1 signal at the gate electrode of the P2 device renders this device nonconductive. Consequently, output terminal $C_n$ is connected, via the conduction paths of devices P1 and N1 (as well as line 14) to receive, directly, the signal supplied at terminal $B_n$. Conversely, output terminal $C_n$ is decoupled from input terminal $C_{n-1}$ because of the nonconduction of devices P2 and N2.

However, if a binary 1 is supplied at one of the terminals and a binary 0 is supplied at the other input terminal, logic gate 10 will produce a binary 1 output signal (see Table I). This binary 1 signal is applied along line 15 to the input of inverter 13 and to the gate electrodes of devices P1 and N2. The inverted or binary 0 signal produced by inverter 13 is applied to the gate electrodes of devices N1 and P2. Consequently, devices P2 and N2 are rendered conductive while devices P1 and N1 are rendered nonconductive. With these conditions, terminal $C_{n-1}$ is connected along line 16, through the conduction paths of devices P2 and N2, to output terminal $C_n$. In this condition, it is inconsequential as to the specific values of the signals at terminals $A_n$ and $B_n$ inasmuch as these signals are not connected through to output terminal $C_n$.

In addition, the circuit produces the sum signal S at terminal $S_n$. This signal is generated by gate 11 which is, as noted, an exclusive OR gate. Gate 11 receives signals from the $C_{n-1}$ input terminal and from the output terminal of gate 10. The signal from gate 10 is determined by the signals at terminals $A_n$ and $B_n$. The signal supplied by gate 10 may be a binary 1 or a binary 0 as described supra. Likewise, the signal at terminal $C_{n-1}$ may be a binary 0 or a binary 1. The output signal $S_n$ at terminal $S_n$ is a direct function of these signals and the operation of exclusive OR gate 11. It will be seen that the standard logic addition in binary operations is followed. Thus, if the signals at the $A_n$ and $B_n$ terminals are identical, i.e. both binary 0's or both binary 1's, a binary 0 is produced by gate 10 and supplied to input gate 11. Thus, the output signal at terminal $S_n$ produced by gate 11 is a direct function of the value of the signal supplied at terminal $C_{n-1}$. In the event that this last mentioned signal is a binary 0, then a binary 0 will be supplied by gate 11. Conversely, if the signal at terminal $C_{n-1}$ is a binary 1, gate 11 will produce a binary 1 output signal.

This output signal is representative of binary addition and may be seen to properly represent this sum since where $A_n$ and $B_n$ are 0 and the carry is a 0, the sum should be a 0. Conversely, if $A_n$ and $B_n$ are 0's and the carry is a 1, the sum should be a 1. This set of conditions is properly obtained. Likewise, if the augend and addend ($A_n$ and $B_n$) are both binary 1's, a carry-in signal of binary 1 should also cause a sum signal of binary 1 to be generated. Conversely, in this condition, a binary 0 signal at the carry-in terminal should generate a binary 0 output signal at the sum terminal. Again, these conditions are satisfied by this circuit. Consequently, this circuit produces both the sum and carry output signals which are appropriate for an adder circuit.

What is more important, this type of carry generation is readily adaptable to integrated circuit technology such as MOS techology. This circuit permits all of the transmission gates (for example, those in switch 12) to be preset by the output signal from gate 10 before the carry-in signal arrives to be transmitted. Consequently, inasmuch as the carry network is typically the speed limiting factor in integrated circuit technology, this circuit permits faster operation since the carry signal is generated directly to the carry output terminal through switch 12. Moreover, since there is no logical inversion at each adder segment (i.e. either an inversion stage or alternating stages of inverted logic), the delay for the carry signal operation is substantially minimized.

Figure 2:
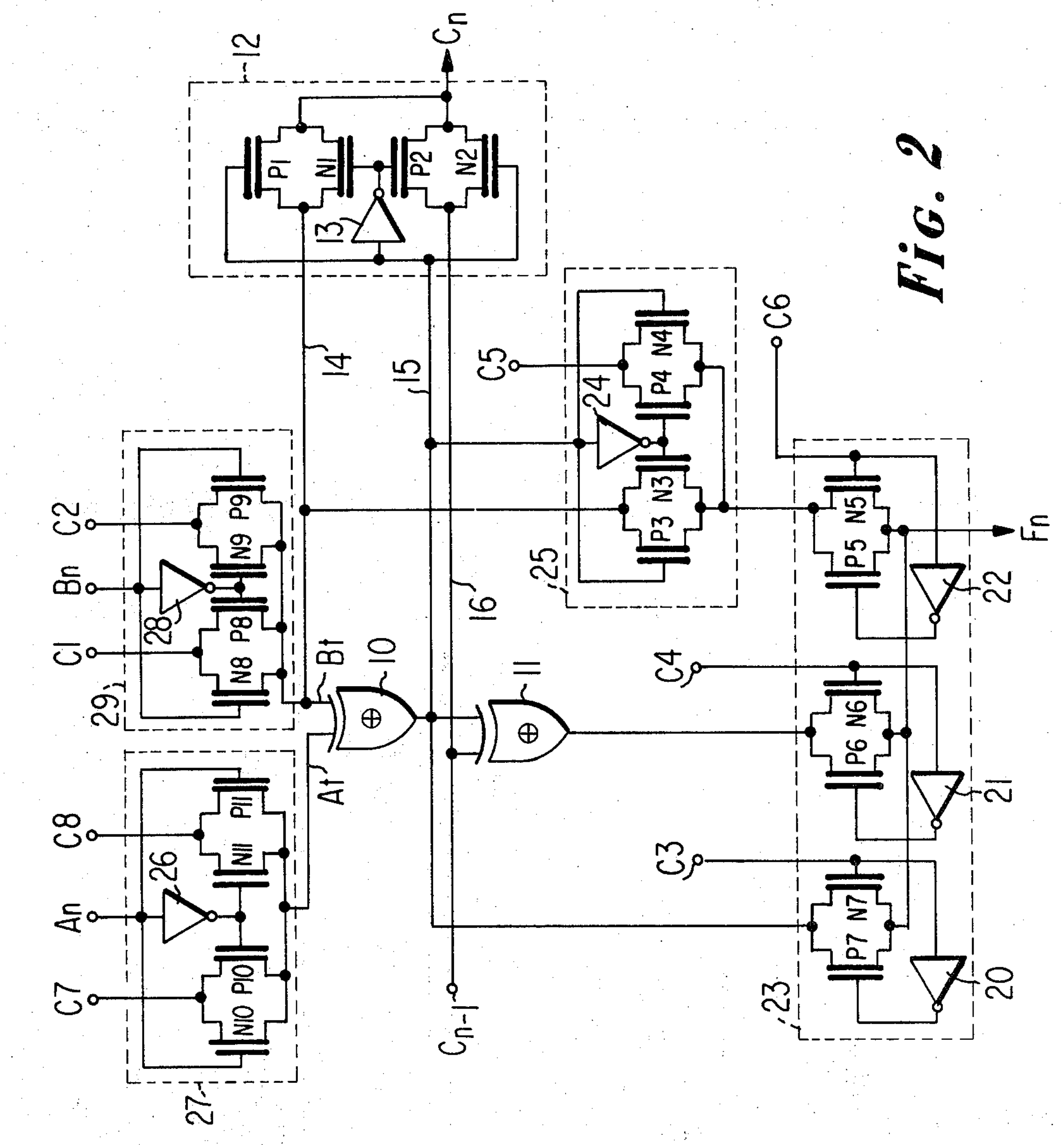
FIG. 2 is a schematic diagram of a multifunction arithmetic unit which is another embodiment of the instant invention.

Referring now to FIG. 2, there is shown a multifunction arithmetic circuit utilizing an adder stage of the type shown in FIG. 1. In these figures, elements which are similar bear similar reference numerals.

In the circuit shown in FIG. 2, gates 10 and 11 are exclusive OR gates as defined supra. The output of gate 10 is connected to one input of gate 11 and, via line 15, to one input of switch 12. The other input of gate 11 is connected to receive signals from terminal $C_{n-1}$. In addition, input terminal $C_{n-1}$ is connected along line 16 to the parallel connected conduction paths of MOS devices P2 and N2 in switch 12. Again, the other ends of the conduction paths of devices P2 and N2 are connected together and to output terminal $C_n$.

The output terminal $C_n$ is also connected to one end of the conduction paths of MOS devices P1 and N1 as described supra. The other ends of the parallel connected conduction paths of devices P1 and N1 are connected along line 14 to one input of gate 10. The gate electrodes of devices N1 and P2 are connected together and to the output of inverter 13. The gate electrodes of devices P1 and N2 are connected together and to the input of inverter 13. This junction is connected via line 15 to the output of gate 10. This much of the circuit, as described, is substantially similar to the circuit shown in FIG. 1. The inputs to gate 10 are supplied from switch circuits 27 and 29. Switch circuits 27 and 29 are substantially similar in construction to switch circuit 12. That is, taking for example switch 27, a first pair of MOS devices, namely devices N10 and P10, have the conduction paths thereof connected in parallel. One end of the parallel connection is connected to terminal C7 to which control signal C7 is supplied. The other end of the parallel connected conduction paths of devices N10 and P10 is connected to an input $A_t$ of gate 10. Another pair of MOS devices N11 and P11 have the conduction paths thereof connected in parallel and one end thereof connected to the $A_t$ input of gate 10. The other end of the conduction paths of devices N11 and P11 is connected to terminal C8 to receive the control signal C8. The gate electrodes of devices P10 and N11 are connected together and to the output of inverter 26. The input of inverter 26 and the gate electrodes of devices N10 and P11 are connected to terminal $A_n$ to receive the $A_n$ addend signal.

Switch 29 is very similar in configuration. Here, devices N8 and P8 have the conduction paths thereof connected in parallel while devices N9 and P9 have the conduction paths thereof connected in parallel. One end of each of these parallel connected combinations is connected to another input $B_t$ of gate 10 and along line 14 to switch 12. The gate electrodes of devices P8 and N9 are connected to the output of inverter 28. The input of inverter 28 along with the gate electrodes of devices N8 and P9 are connected to terminal $B_n$ to receive the $B_n$ augend input signal. In addition, control terminal C1 is connected to the other end of the parallel combination of conduction paths of devices N8 and P8. Likewise, control terminal C2 is connected to the other end of the conduction paths of devices P9 and N9.

Switch 25 is also similar to the switches noted supra. In switch 25, MOS devices P3 and N3 have the conduction paths thereof connected in parallel. Similarly, MOS devices P4 and N4 have the conduction paths connected in parallel. One end of each of the parallel combinations is connected together and supplies an input to three-way gate 23 described hereinafter. The other ends of the conduction paths of devices P4 and N4 are connected to control terminal C5 to receive control signal C5. The other ends of the conduction paths of devices P3 and N3 are connected to the output of switch 29. The gate electrodes of devices P3 and N4 are connected together and to the input of inverter 24. This common connection is connected to line 15 which is connected to the output of gate 10. The output of inverter 24 is connected to the gate electrodes of devices N3 and P4.

Switch 23 is a three-way switch. Switch 23 includes three transmission gates comprising parallel combinations of P and N devices. For example, the conduction paths of devices P5 and N5 are connected in parallel with one end thereof connected to the output of switch 25 as described supra. The other end of the parallel connected conduction paths is connected to output terminal $F_n$. Control terminal C6 at which control signal C6 is supplied is connected to the gate electrode of device N5 and to the input of inverter 22. The output of inverter 22 is connected to the gate electrode of device P5.

Similarly, devices P6 and N6 have the conduction paths thereof connected together in parallel. One end of this parallel connection is connected to the output of gate 11 while the other end thereof is connected to output terminal $F_n$. Control terminal C4 to which control signal C4 is applied is connected to the gate electrode of device N6 and the input of inverter 21. The output of inverter 21 is connected to the gate electrode of device P6.

Devices N7 and P7 have the conduction paths thereof connected in parallel. One end of this parallel connection is connected to output terminal $F_n$. The other end of the parallel connection is connected to the output terminal of gate 10. Control terminal C3, to which control signal C3 is applied, is connected to the gate electrode of device N7 and to the input of inverter 20. The output of inverter 20 is connected to the gate electrode of device P7.

What has been described is a multi-function arithmetic unit stage which includes input terminals for the addend ($A_n$), the augend ($B_n$) and the carry-in signal ($C_{n-1}$). The carry-out signal ($C_n$) is provided as well as the output signal $F_n$ which may represent the sum or any of the other logical output signals provided by the circuit. Eight control signals are supplied to the circuit to control the application of signals to the circuit and the interaction of the various signals such that several arithmetic functions are available. For example, the circuit can produce the sum, an exclusive OR output, a logical OR output or a logical AND output. These functions are dictated by the control signal combinations which are supplied to the circuit. For example, the operation of switch 29 is controlled by control signals C1 and C2. The operation is depicted in Table III below:

TABLE III

| C1 | C2 | $B_t$ ($B_n$ transformed) |
|---|---|---|
| 1 | 1 | 1 |
| 1 | 0 | $B_n$ |
| 0 | 1 | $B_n$ |
| 0 | 0 | 0 |

Thus, it is seen that the signal applied at terminal $B_n$ is operated upon by switch 29 and the appropriate output signal (i.e. $B_t$, where $B_t$ is the transformed version of input signal $B_n$) is applied to one input terminal of gate 10. If the signals at terminals C1 and C2 are a binary 1 and a binary 0 respectively, then the signal at terminal $B_n$ is transmitted (as signal $B_t$) to gate 10 without inversion. Conversely, by making the signals at terminals C1 and C2 a binary 0 and a binary 1 respectively, the signal at terminal $B_n$ is inverted whereby a $B_t$ signal having a value $B_n$ is supplied to gate 10.

On the other hand, if the signals at terminals C1 and C2 are both binary 0's, a binary 0 is transmitted to the input of gate 10 regardless of the value of the signal at terminal $B_n$. That is, regardless of level, the $B_n$ signal will always enable one of the transmission gates and the appropriate control signal (C1 or C2) will be transmitted therethrough. Since both control signals are identical, the output signal $B_t$ is defined. Similarly, if the signal at terminals C1 and C2 are both binary 1's, a binary 1 is transmitted to gate 10 regardless of the value of the signal at terminal $B_n$. Switch 27 operates in an identical manner with the exception that the control signals C7 and C8 are supplied at the appropriate terminals and the signal produced by switch 27 is the $A_t$ output signal.

Thus, the operations of switches 27 and 28 control the status or binary values of the signals supplied to gate 10. These signals are dictated by control signals C1, C2; C7 and C8. However, the transformations of the $A_n$ and $B_n$ signals are independent of the other controls in this arithmetic unit. Switches 27 and 29 have the effect of feeding signals to the adder network which comprises exclusive OR gates 10 and 11 as well as switch 12 as suggested in FIG. 1.

That is, the carry-in signal $C_{n-1}$ is supplied from the adjacent, less significant stage and the carry-out signal $C_n$ is supplied to the adjacent, more significant bit stage. The sum output signal is formed at the output of gate 11. This type of operation is described in detail relative to FIG. 1. However, the signal from gate 11 is now supplied to one input terminal of three-way transmission switch 23. The sum signal is supplied to output terminal $F_n$ only when control signal C4 is a binary 1 while control signals C3 and C6 are binary 0's. That is, the sum transmission gate including devices P6 and N6 is rendered conductive and the other transmission gates are rendered nonconductive. Therefore, the sum output signal is produced at output terminal $F_n$.

When the signal supplied to control terminal C3 is a binary 1 and the signals supplied to terminals C4 and C6 are binary 0's, the transmission gate comprising devices P7 and N7 is rendered conductive and the other transmission gates are nonconductive. Thus, the output of exclusive OR gate 10 is connected to output terminal $F_n$. Consequently, the circuit operates to produce the "exclusive OR" function of the signals $A_t$ and $B_t$ produced by switches 27 and 28 as described supra.

When control signal C6 is a binary 1 and control signals C3 and C4 are binary 0's, the transmission gate comprising devices P5 and N5 is rendered conductive while the other transmission gates are rendered nonconductive. Under these conditions, the output of switch 25 is connected to output terminal $F_n$. The output function signal is then either a logical AND or a logical OR of the signals at terminals $A_t$ and $B_t$. Whether a logical OR or a logical AND is provided is dependent upon the control signal C5 as described infra. The operation of switch 23 as controlled by control signals C3, C4 and C6 is summarized in Table IV below:

TABLE IV

| C3 | C4 | C6 | C5 | Function Selected |
|---|---|---|---|---|
| 1 | 0 | 0 | X | $A_t \cdot B_t$ |

| | | | | |
|---|---|---|---|---|
| 0 | 1 | 0 | X | $A_t \cdot B_t$ |
| 0 | 0 | 1 | 0 | $A_t \cdot B_t$ |
| 0 | 0 | 1 | 1 | $A_t + B_t$ |

Where X = don't care
Where   = exclusive OR

As suggested supra, the operation of switch 25 determines whether or not a logical OR or a logical AND function is provided at output terminal $F_n$. The operation of switch 25 is indicated in Table V below:

TABLE V

| | C5 | $A_t$ | $B_t$ | $A_t$  $B_t$ | A · B | A + B |
|---|---|---|---|---|---|---|
| | 0 | 1 | 1 | 0 | 1 | N/A |
| Logical | 0 | 1 | 0 | 1 | 0 | N/A |
| AND | 0 | 0 | 1 | 1 | 0 | N/A |
| | 0 | 0 | 0 | 0 | 0 | N/A |
| | 1 | 1 | 1 | 0 | N/A | 1 |
| Logical | 1 | 1 | 0 | 1 | N/A | 1 |
| OR | 1 | 0 | 1 | 1 | N/A | 1 |
| | 1 | 0 | 0 | 0 | N/A | 0 |

As suggested supra, the switch is controlled as a function of the logic level of the signal C5 at terminal C5. In addition, of course, the output signal from gate 10 provides a further control function. That is, switch 25 is switched to one of two conditions by the output of gate 10. However, control of the operation of switch 25 (i.e. whether a logical "AND" or a logical "OR" operation pertains) is controlled by the condition of the signal at terminal C5. For example, if a logical AND operation is desired, a binary 0 signal is applied at terminal C5. Under these conditions, it is seen that if the transformed signals $A_t$ and $B_t$ at the inputs of gate 10 compare (i.e. are identical) a binary 0 is supplied by gate 10 to the input of inverter 24 as well as to the gate electrodes of devices P3 and N4. These signal conditions will render the transmission gate comprising devices P4 and N4 nonconductive. Conversely, the transmission gate comprising devices P3 and N3 will be rendered conductive because of the signals supplied to the gate electrodes of the devices. Consequently, the $B_t$ signal at the input terminal of gate 10 will be transmitted through switch 25 and switch 23 to output terminal $F_n$. If the signal $B_t$ is a binary 1, a binary 1 will be produced at terminal $F_n$. Conversely, if the $B_t$ signal is a binary 0, a binary 0 will be produced at terminal $F_n$. This condition represents a logical AND inasmuch as a logical AND normally requires two high level input signals to produce a high level output signal. Inasmuch as the output signal produced by gate 10 is indicative of the fact that both input signals are of the same level, detecting one of the input signals is akin to detecting the level of both of the input signals.

Continuing in the logical AND operation, if the signals $A_t$ and $B_t$ do not match, then gate 10 produces a binary 1 output signal. This signal is applied to the input of inverter 24 and is inverted thereby. Consequently, a binary 1 signal is supplied to the gate electrodes of devices P3 and N4 while a binary 0 signal is supplied to the gate electrodes of devices N3 and P4. Now, the transmission gate comprising devices P4 and N4 is rendered conductive and the binary 0 signal at terminal C5 is, effectively, transmitted to terminal $F_n$ via switch 23. Again, this output signal shows that the two input signals $A_t$ and $B_t$ are not both binary 1's, whereby the logical AND output signal must be a binary 0.

Conversely, if a logical OR operation is desired by switch 25, the signal at terminal C5 is a binary 1. Again, the signal supplied to inverter 24 is a function of the values of the input signals $A_t$ and $B_t$ at gate 10. If it is initially assumed that the input signals to gate 10 compare, then, again, the transmission gate comprising devices P3 and N3 is conductive and supplies the signal at terminal $B_t$ to output terminal $F_n$ as discussed supra. If the signal $B_t$ is a binary 0, a binary 0 is applied to terminal $F_n$; however, if the signal $B_t$ is a binary 1, a binary 1 is applied at terminal $F_n$. This logical OR operation is appropriate inasmuch as a logical operation determines that at least one of the inputs is a binary 1. If neither of the inputs is a binary 0, then the output is also a binary 0.

If now, the input signals at gate 10 do not compare, the output signal produced by gate 10 is a binary 1 signal which causes the transmission gate comprising devices P3 and N3 to be nonconductive but renders the transmission gate comprising devices P4 and N4 conductive. In these conditions, the binary 1 signal at terminal C5 is transmitted through to output terminal $F_n$. Again, logical OR operation is satisfied inasmuch as at least one of the input signals to gate 10 must be a binary 1 signal and a binary 1 output at terminal $F_n$ is produced in either case.

Thus, there has been shown and described an arithmetic unit (FIG. 1). This arithmetic unit comprises at least one stage including a pair of exclusive OR gates and a two-way transmission gate. Another embodiment (FIG. 2) of the invention uses the arithmetic unit noted supra and, as well, includes additional control elements whereby additional logical functions can be produced by the circuit. It is to be understood that the diagrams and description are intended to be illustrative of the invention and not limitative thereof. Those skilled in the art will recognize that certain modifications can be made to the circuit shown without departing from the inventive concept shown. For example, the MOS devices may be reversed as to conductivity type while the signal levels may be inverted and the like. Moreover, while this description is given in terms of MOS type circuitry, any other suitable type circuitry is intended to be included within the description. The scope of this invention is to be limited only by the claims apended hereto.

What is claimed is:

1. In combination:

binary full-adder circuit means having a first exclusive OR gate with first and second input terminals adapted to receive first and second binary signals, respectively, and producing the logical exclusive OR function thereof at a first output terminal, said circuit means having a second exclusive OR gate for receiving the output from said first output terminal and a carry-in binary signal and producing the logical exclusive OR function thereof at a second output terminal representative of the arithmetic sum of said first, second and carry-in binary signals, said circuit means including means coupled to said first and second exclusive OR gates for producing a signal representative of the arithmetic carry of the input signals; and switch means having a pair of input terminals, a control terminal and an output terminal, one switch means input terminal adapted to receive a source of reference potential, the other switch means input terminal connected to one input terminal of said first exclusive OR gate, and the switch means control terminal connected to said first output terminal for selectively connecting one of the switch means input terminals to the switch means output terminal.

2. The combination recited in claim 1 wherein said switch means comprises:

two pairs of complementary transistors, each transistor having a conduction path and a second electrode for controlling the conduction of the path, each pair of said complementary transistors coupled between a separate one of said pair of input terminals of said switch means and said switch means output terminal; and means coupling said control electrodes to said switch means control terminal for turning both transistors of one pair of complementary transistors on while maintaining both transistors of the other pair of complementary transistors off in response to signals present on said switch means control terminal.

3. The combination recited in claim 1 further comprising a three-input switch means, each input being coupled to a separate one of the output terminals of said first exclusive OR gate, said second exclusive OR gate and said switch means, said three-input switch means having an output terminal and a plurality of control terminals whereby signals applied to the three inputs are selectively conducted to said output terminal of said three input switch means in response to signals applied to said plurality of control terminals.

4. The combination recited in claim 1 further comprising a second switch means having a pair of input terminals, a control terminal and an output terminal, each input terminal adapted to receive a separate source of reference potential, the output terminal coupled to one of the input terminals of said first exclusive-OR gate and the control terminal adapted to receive a source of binary signals so that signals applied to the input terminals are selectively conducted to said output terminal of said second switch means in response to said binary signals applied to the control terminal of said second switch means.

* * * * *

UNITED STATES PATENT OFFICE PAGE ONE

CERTIFICATE OF CORRECTION

Patent No. 3,767,906 Dated October 23, 1973

Inventor(s) Richard Lee Pryor

It is certified that error appears in the above-identified patent and that said Letters Patent are hereby corrected as shown below:

Following column 4, line 63, insert the following paragraph:

"Inasmuch as gate 10 is an exclusive OR gate which operates as defined in Table I supra, application of binary 1 signals at both terminals $A_n$ and $B_n$ will also produce a binary 0 signal at the output of gate 10. This signal, when supplied to transmission gate switch 12, is such that devices P1 and N1 will be conductive while devices P2 and N2 will be nonconductive as described before. However, in this case, a binary 1 input signal at terminal $B_n$ is transmitted via line 14, the conduction paths of devices P1 and N1, through to output terminal $C_n$. As suggested supra, in each of these types of operation (i.e. identical signals at $A_n$ and $B_n$), the condition of the signal at terminal $C_{n-1}$ is inconsequential and can be ignored logically. Therefore, this signal is decoupled from the output circuit at terminal $C_n$."

UNITED STATES PATENT OFFICE
CERTIFICATE OF CORRECTION

Patent No. 3,767,906 Dated October 23, 1973

Inventor(s) Richard Lee Pryor

It is certified that error appears in the above-identified patent and that said Letters Patent are hereby corrected as shown below:

At column 7, line 60 change "0 1 Bn"
to --- 0 1 $\overline{B}$n---

At column 8, line 5 change "Bn" to ---$\overline{B}$n"---

At column 8, last line change "$A_t$ $B_t$" to ---$A_t \oplus B_t$---

At column 9, line 4 change "where = exclusive OR"
to ---"where $\oplus$ = exclusive OR"---

At column 9, line 12 change "C5 $A_t$ $B_t$ $A_t$ $B_t$ A˙B A+B"
to---C5 $A_t$ $B_t$ $A_t \oplus B_t$ A·B A+B---

Signed and sealed this 26th day of March 1974.

(SEAL)
Attest:

EDWARD M.FLETCHER,JR.
Attesting Officer

C. MARSHALL DANN
Commissioner of Patents